(12) United States Patent
Schlueter et al.

(10) Patent No.: US 6,240,471 B1
(45) Date of Patent: *May 29, 2001

(54) DATA TRANSFER INTERFACING

(75) Inventors: Erick A. Schlueter, Canastota; Mark H. Linderman; Richard W. Linderman, both of Rome, all of NY (US)

(73) Assignee: The United States of America as represented by the Secretary of the Air Force, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,914

(22) Filed: Sep. 10, 1996

(51) Int. Cl.[7] .................................................. G06F 13/00
(52) U.S. Cl. ................................................................ 710/62
(58) Field of Search ..................................... 395/882, 883, 395/884, 885, 873, 877; 710/62

(56) References Cited

U.S. PATENT DOCUMENTS

| | | | |
|---|---|---|---|
| 5,222,216 | 6/1993 | Parish et al. | 395/275 |
| 5,265,216 | 11/1993 | Murphy et al. | 395/325 |
| 5,305,436 | 4/1994 | Mundkur | 395/162 |
| 5,331,219 | 7/1994 | Nakamura | 307/475 |
| 5,448,715 | 9/1995 | Lelm et al. | 395/550 |
| 5,581,566 | * 12/1996 | St. John et al. | 371/37 |
| 5,610,745 | * 3/1997 | Bennett | 359/139 |
| 5,615,344 | * 3/1997 | Corder | 710/129 |
| 5,638,518 | * 6/1997 | Malladi | 395/200.21 |
| 5,663,818 | * 9/1997 | Yamamoto et al. | 359/118 |
| 5,671,355 | * 9/1997 | Collins | 709/250 |
| 5,734,872 | * 3/1998 | Kelly | 395/500.41 |
| 5,765,027 | * 6/1998 | Wang et al. | 710/40 |
| 5,805,834 | * 9/1998 | McKinley et al. | 710/103 |
| 5,832,244 | * 11/1998 | Jolley et al. | 710/129 |
| 5,842,039 | * 11/1998 | Hanaway et al. | 710/11 |

* cited by examiner

Primary Examiner—David A. Wiley
(74) Attorney, Agent, or Firm—William G. Auton; Harold L. Burstyn (57) ABSTRACT

A single Printed Circuit Board (PCB) designed to acquire data from a multiplicity of heterogeneous sources and convert the data to a high performance protocol suitable for transmission over long distances via fiber optic lines. A specific embodiment uses the Fiber Channel protocol on fiber optic cables to carry information between sensors and high performance computers (HPC). The High Performance Parallel Interface (HiPPI) is used as the protocol to connect to the HPC. Simplex (unidirectional) and full duplex communications are supported.

10 Claims, 8 Drawing Sheets

DATA TRANSFER INTERFACING

STATEMENT OF GOVERNMENT INTEREST

The invention described herein may be manufactured and used by or for the Government for governmental purposes without the payment of any royalty thereon.

BACKGROUND

This invention relates to the interface connection of electronic sensors, such as radars, and to electronic detectors, such as high performance computers (HPCs). HPCs have a standard data transfer interface or "protocol", such as the High Performance Parallel Interface (HiPPI), which specifies both the physical connectors and a signaling protocol, but sensors, e.g., radars, have unique outputs and can be physically separated from HPCs by tens to thousands of meters. Currently there are no devices or procedures that allow unique and varied input formats to interface to a HIPPI protocol.

There is a further complication that the radar sensor channels may output 40–80 Million bytes of information per second. As a result, a high level of performance is needed over relatively long distance communication channels.

"Modem" or modulator/demodulator-like interfaces can be used to interconnect HIPPI serially across fiber optic lines. The current procedure is to use a modem that adapts HIPPI for transmission over a serial fiber optic line. Although HIPPI is a "parallel" connection, this kind of interface is known as "serial" HIPPI. However, there has been no reconfigurable implementation for adapting a design for non-HIPPI protocols.

The interfacing of different data protocols necessitated by different electronic sensors is typically done by providing a unique solution for each different data transfer procedure. The standard procedure is to have one printed circuit board (PCB) which implements the interface for each different protocol. Consequently there is a need to change the PCB each time a different protocol is desired. This greatly increases the logistical complexity and cost by requiring the availability of multiple PCB interface designs.

SUMMARY OF THE INVENTION

In accomplishing the foregoing and related objects, the invention provides an interconnect, such as a printed circuit board (PCB), for a multiplicity, e.g., 32, heterogeneous sensor channels with a variety of interface specifications. The interconnect is between a detector, such as a high performance computer, and a sensor, such as a radar, across a medium such as fiber optic lines using a serial protocol such as Fibre Channel.

Each channel requires a plurality of lines, for example fiber optic cable, to support bi-directional communications and feedback. For each channel, one implementation of the PCB is used at the sensor (for sending information) and one implementation is used at the computer (for receiving information). However, bi-directional communications between receivers, e.g. computers, are also supported.

Accordingly it is an object of the invention to facilitate the connection of electronic sensors, such as radars, to electronic detectors, such as high performance computers (HPCs). A related object is and to facilitate the connection of HPCs which have a standard data transfer protocol, known as the High Performance Parallel Interface (HIPPI). Another related object is to facilitate the connection of sensors, e.g., radars, which have unique outputs and can be physically separated from destination computers, such as HPCs, by tens to thousands of meters.

A further object of the invention is to allow unique and varied input formats to interface to the HiPPI protocol. A related object is to accommodate sensor channels that may output 40–80 Million bytes of information per second. Another related object is to achieve high performance data transfer rates for relatively long distance communications.

Another object of the invention is to implement printed circuit board (PCB) designs for non-HiPPI data transfer protocols to HiPPI protocols. A related object is to design a PCB with a flexible interface that can operate with each new kind of sensor or protocol. Another related object is to use the same PCB design at both ends of an interface to afford a simple solution for high performance data transfers.

DESCRIPTION OF THE DRAWINGS

Other aspects of the invention will become apparent after considering several illustrative embodiments, taken in conjunction with the drawings, in which.

DETAILED DESCRIPTION

Figure 1:
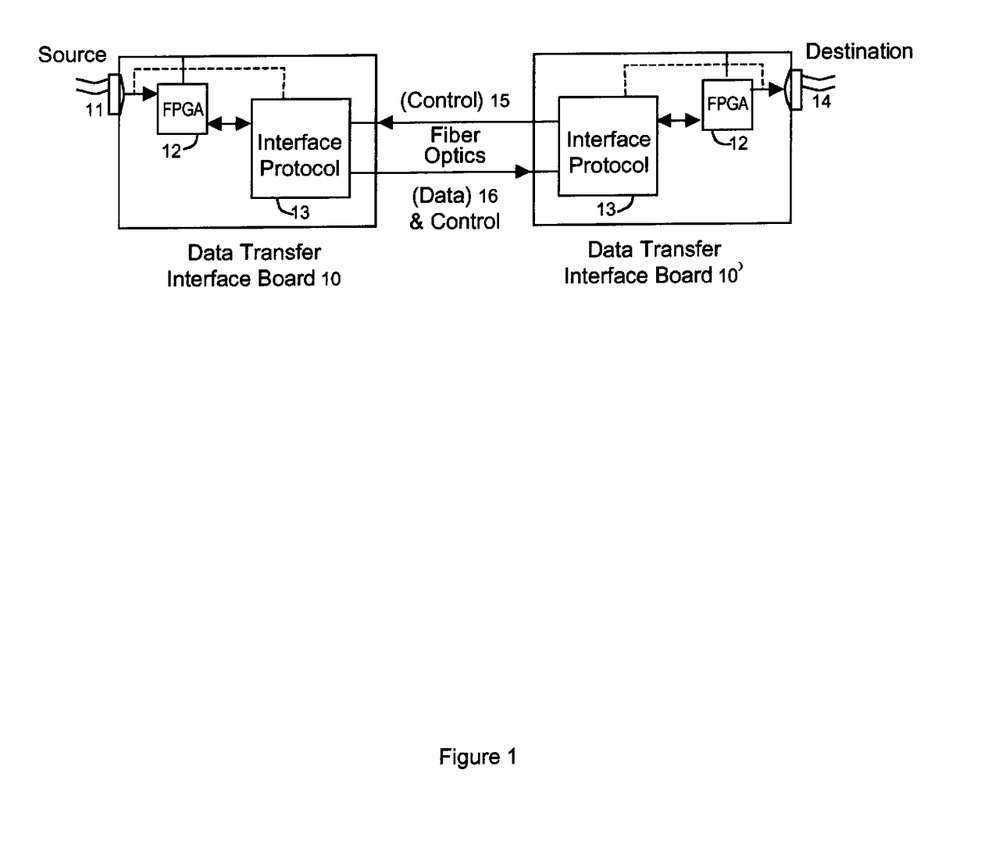
FIG. 1 is a block and schematic diagram of a unidirectional or simplex communications system in accordance with the invention.

With reference to FIG. 1, a simplex or unidirectional transmission system of the invention employs a source data transfer interface board 10 and a destination data transfer interface board 10'. The boards 10 and 10' are coupled to one another by fiber optic lines 15 and 16. Line 16 communicates data and control information from board 10 to 10'. Line 15 communicates control information from board 10' to board 10. Within each interface board 10 or 10' is a programmable logic device such as a field programmable gate array (FPGA) 12. The FPGA 12 of the board 10 receives signals from a source 11, such as radar (not shown), and transfers them to a standard interface 13, while the corresponding FPGA 12 of the board 10' receives signals from a standard interface 13 and transfers them to a destination 14, such as a computer (not shown).

It is necessary to tailor each interface 13 to each different source 11. The invention, however, permits the FPGA 12 to be programmed for sources that are not directly compatible with the interface 13. As a result, it is not necessary to provide a different interface 13 for each different source 11.

Figure 2A:
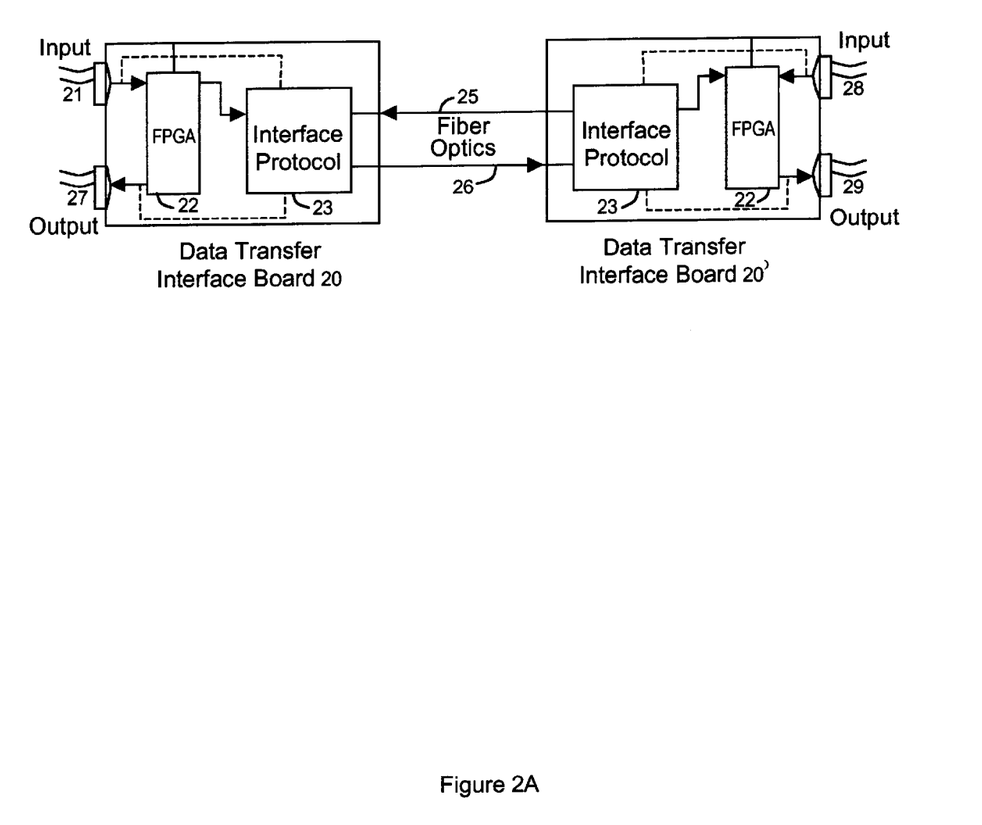
FIG. 2A is a block and schematic diagram of bidirectional or duplex communications system in accordance with the invention.

While the simplex system of FIG. 1 allows transmission of data unidirectionally from the board 10 to the board 10', the duplex system of FIG. 2 permits bidirectional transfer of data. Thus data originating at board 20 can be sent to board 20', and, reciprocally, data from board 20' can be sent to board 20. The invention accommodates different inputs 21 and 28, but the outputs 27 and 29 are of the same protocol. The input 21 is associated with the output 29, while the input 28 is associated with output 27.

Figure 3:
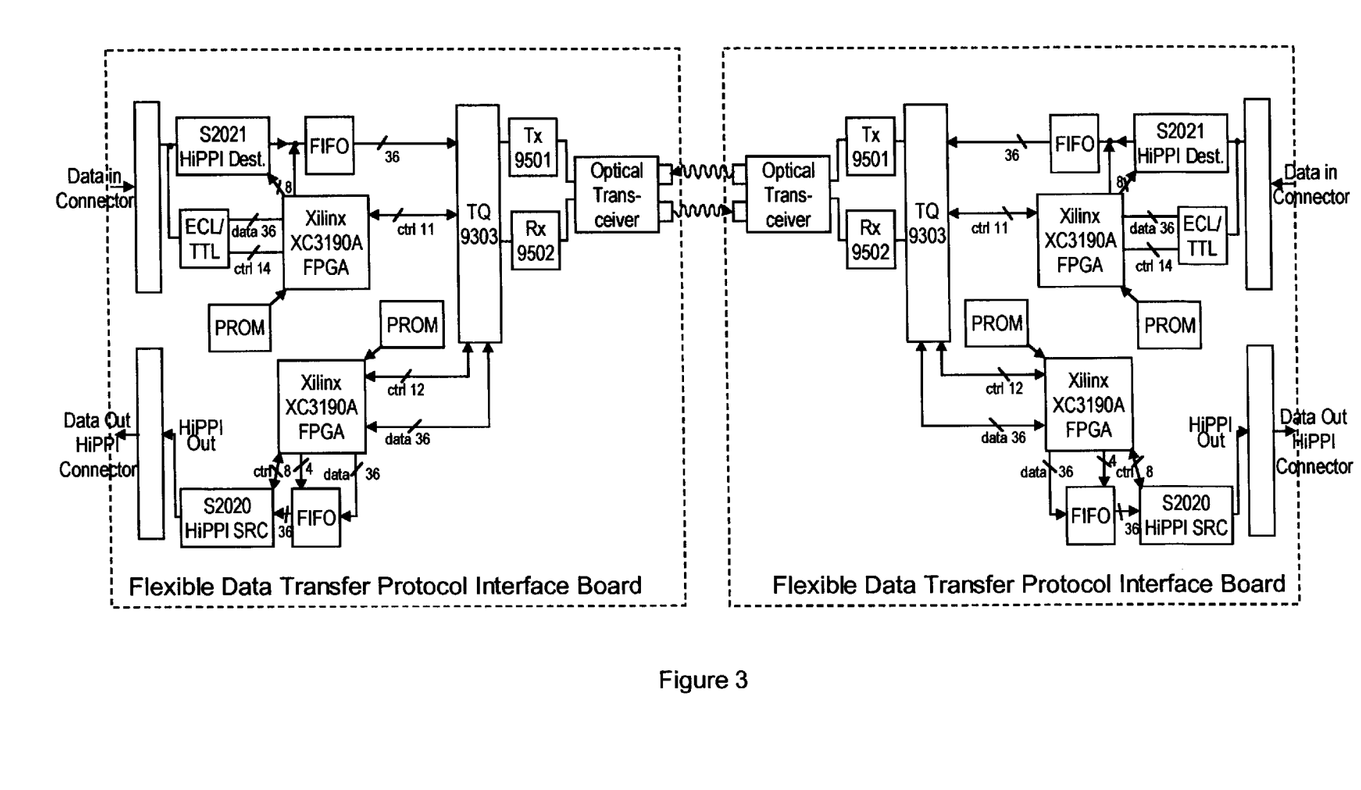
FIG. 3 is a block diagram illustrating the interconnect of a pair of interface boards such as those shown in FIG. 2A.

Details for making this kind of accommodation are illustrated in FIG. 3 for the data transfer board 20, for which the internal components are shown for the interface 23 and the field programmable gate array 22.

Figure 2B:
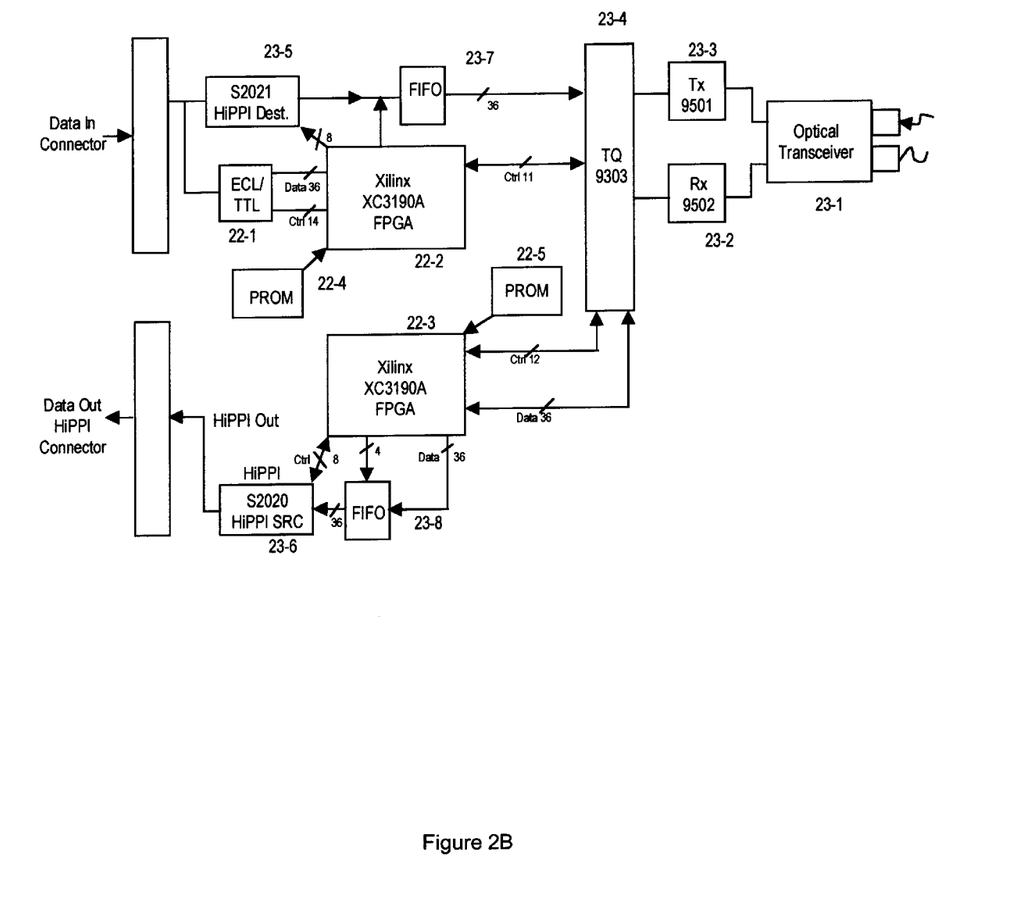
FIG. 2B is a block diagram with details of the components in FIG. 2A on one interface board.

The interface 13 and 23 can be a structure formed from standard commercial components, which are illustrated in FIG. 2B, and include a standard transceiver 23-1, a receiver 23-2, a transmitter 23-3 and an encoder-decoder 23-4. Where the control and data channels 25 and 26 are fiber optics, the transceiver 23-1 is optical in the sense of being compatible with fiber optic signals. Such a transceiver 23-1 can be implemented, for example, by a model MTR 8510 from the Method Electronics, Inc. of Chicago, Ill.

Elsewhere in the interface 23, the invention builds upon the commercial availability of parts/products supporting high speed information transfer protocols. For example, in the case of a Fibre Channel protocol based on fiber optics connecting the board 20 with the board 20', the transmitter 23-3 can be a model TQ9501, while the receiver 23-2 is a model TQ9502 and the encoder-decoder chip set 234 can be a model TQ9303, all from Triquint Semiconductor Inc. of Beaverton, Oreg.

Also in the interface 23 for a bi-directional HiPPI connection, there is a receiver 23-5, such as a model S2021 chip set, and a sender 23-6, such as the model S2020 chip set, both from Applied Micro Circuits Corporation (AMCC) of San Diego, Calif., for interfacing to an electronic parallel HIPPI protocol.

In addition, the interface 23 includes a buffered FIFO (First In First Out) memory 23-7, which interconnects the receiver 23-5 with an encoder-decoder 23-4. A similar buffered FIFO memory 23-8 is connected to the source 23-6 for data destined for the output 27. The FIFO may be replaced by standard random access memory (RAM) to be controlled by the FPGA. For the receipt of non-HIPPI data from the input 21 a network 22-1 is provided with ECL (Emitter Coupled Logic)/TTL (Transistor-Transistor Logic) and control from FPGA module 22-2. A similar FPGA module 22-3 is used for incoming data. In an instantiation using both modules, 22-2 and 22-3 are provided with respective PROM's (Programmable Read Only Memories) 22-4 and 22-5. PROMs permit the invention to be adapted to a wide variety of field communications conditions. Thus if a non-HIPPI channel is not covered, a new PROM containing the FPGA set-up logic for the new protocol can be installed on the PCB.

The FPGA 22-2 has 36 channels of data and 14 channels of control in relation to the non-HIPPI receiver network 22-1. There also are 8 channels of control for the HIPPI receiver 23-5, and 4 channels for the buffered memory 23-7; 11 channels of control extend between the FPGA 22-2 and the encoder/decoder 23-4.

For the FPGA 22-3, 12 channels of control extend from the encoder/decoder 234, along with 36 data channels, which also extend between the FPGA 22-3 and the FIFO 23-8. In addition, 4 control channels extend between the FPGA 22-3 and the FIFO 23-8, while 8 control channels extend between the FPGA 22-3 and the source 23-6.

FIG. 3 is a block diagram showing details of the components in FIG. 2B on a pair of interface boards.

Figure 4A:
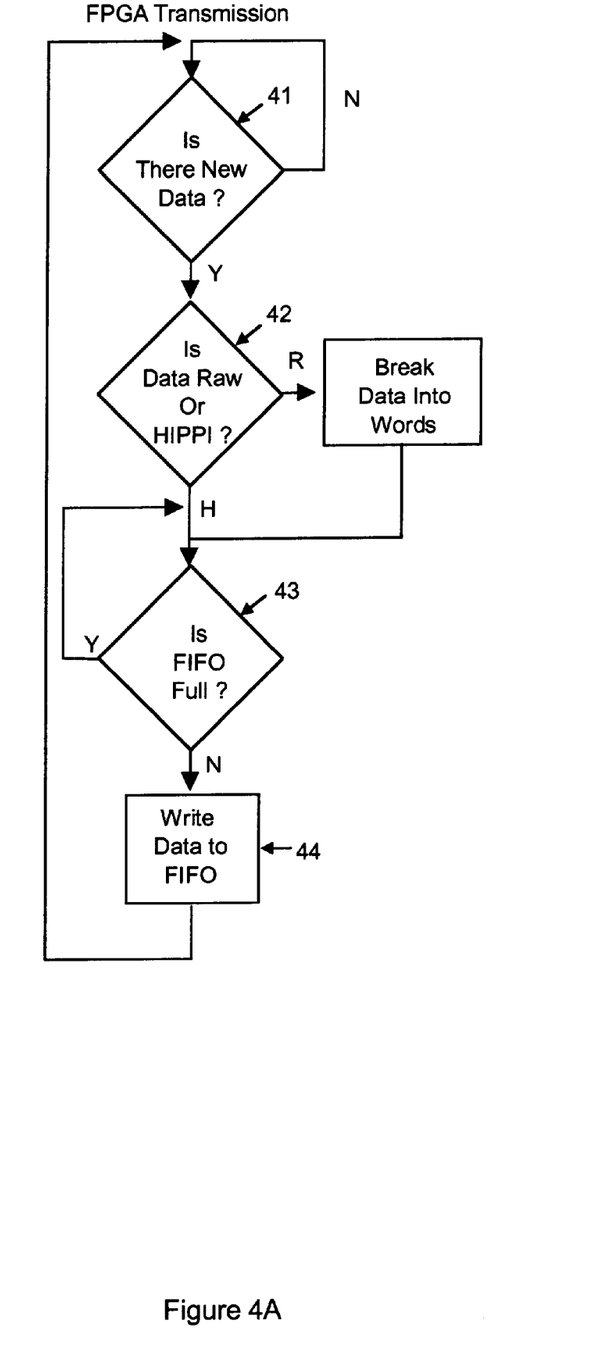
FIGS. 4A and 4B are flow charts for the transmission of information by the system of FIG. 2.
Figure 4B:
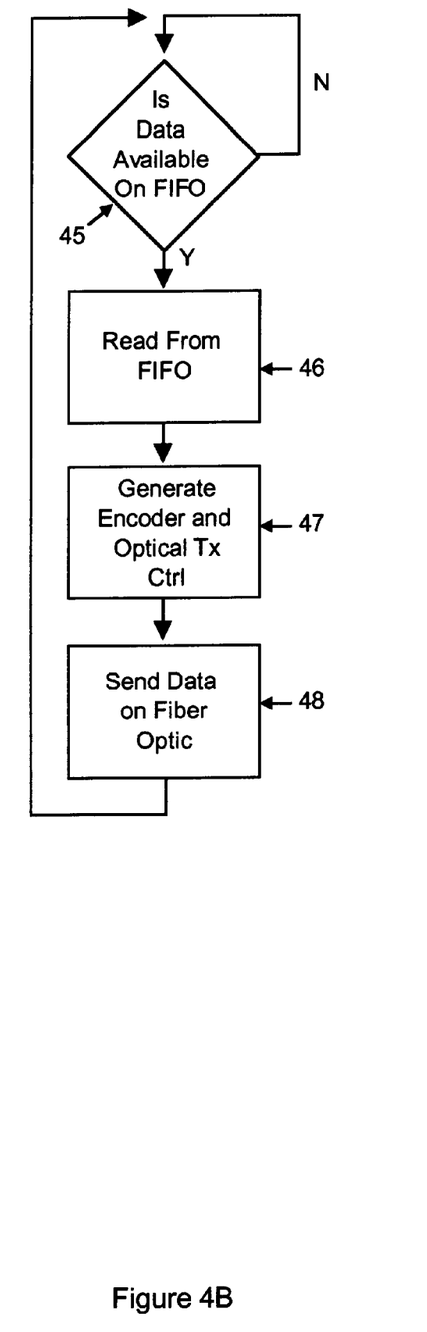
Figure 5A:
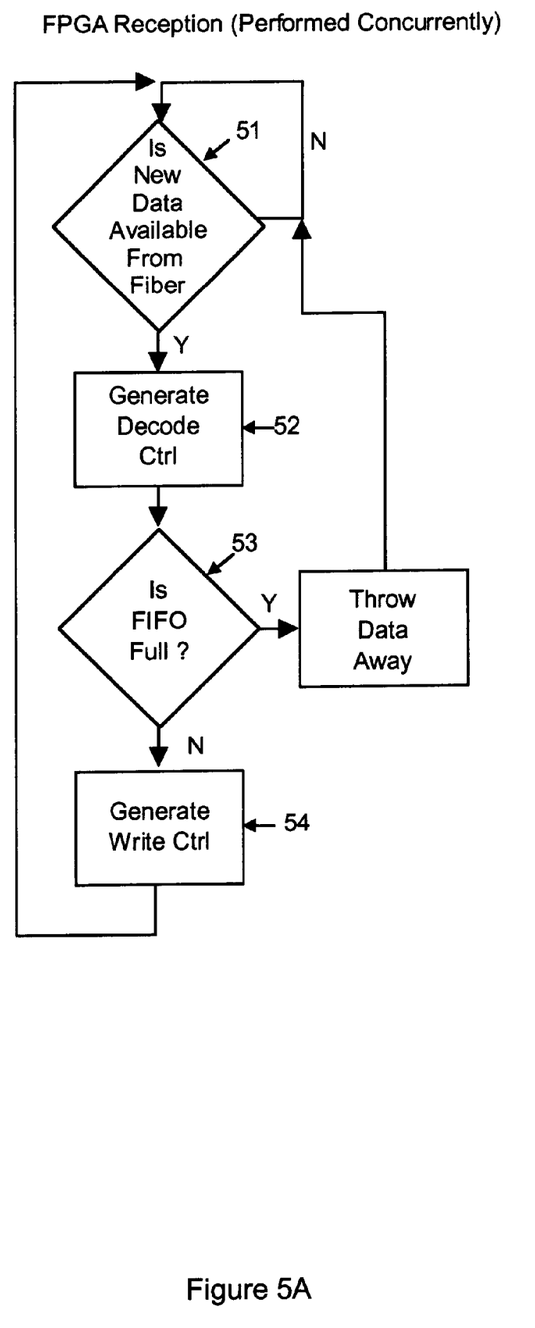
FIGS. 5A and 5B are flow charts for the reception of information by the system of FIG. 2.
Figure 5B:
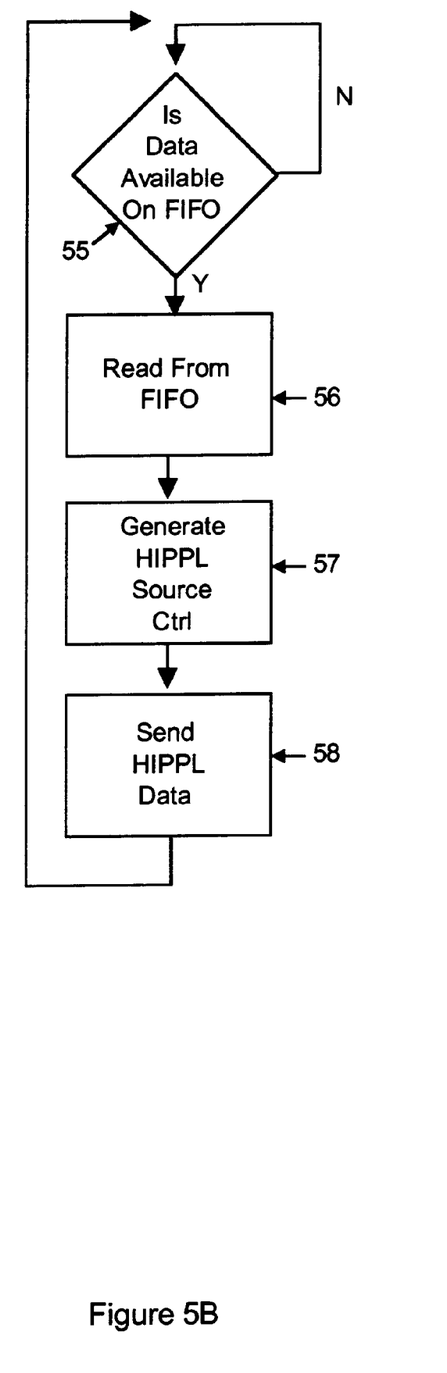

Flow charts for the transmission of information by the systems of FIGS. 2A, 2B and 3 are given in FIGS. 4A and 4B, while FIGS. 5A and 5B provide flow charts for the reception of information.

For transmission of data from the input 21 of FIG. 2A there is a determination, symbolized by block 41 of FIG. 4A, of whether there is new data at the input 21. If there is no new data (N-no of block 41), the interrogation continues until new data is sensed (Y-yes). Then an examination is made, as symbolized by block 42 of FIG. 4A, to determine if the data is in the HIPPI protocol, or if it is non-HIPPI (raw data). If the data is non HIPPI (R-raw), it is formed into "words" and written into the FIFO buffer. If the data is HIPPI (H) it is written into the FIFO memory. The program steps for this to occur first require a determination, symbolized by block 43, of whether the FIFO is full (Y), in which case the data is dumped, or empty (N), in which case the data are written in the buffered FIFO memory 44.

Once the buffered memory 23-7 contains data, it is ready to be sent to the interface 23. The preliminary verification is made as symbolized by block 45 of FIG. 4B, following the data is read from the memory (block 46) and encoder and optical transmission controls are generated (block 47) and the data are sent on the fiber optic 26 (block 48).

Reception, which takes place concurrently with transmission, is governed by the FPGA 22-3 in accordance with the flow charts of FIG. 5. If new data is available on the receiver (block 51), a decode control is generated (block 52). If the FIFO buffered memory 23-8 is full (block 53), the data are discarded. If the FIFO buffered memory is not full, a write control operation is undertaken (block 54).

Once the FIFO buffered memory is full (block 55 of FIG. 5B), reading takes place (block 56) and a HIPPI source control is generated (block 57), following which the data in HIPPI form are sent to the output 27.

While the Model 1240 Fiber Optic HIPPI Modem of Broadband Communications Products, Inc. can make HiPPI to HiPPI connection across fiber optic lines, there is no flexibility in the input protocol (HIPPI) so additional circuit boards are required-to interface to other protocols, such as those emanating from the sensors, or other bus standards.

The Flexible Data Transfer Protocol Interface Board 20 of the invention allows a single PCB design to be used to translate data from either standard or unique input protocols to a standard output protocol, and vice versa, rather than requiring a unique PCB for each different data transfer protocol.

The PCB 20 of the invention is able to support many different protocols at the sources 21 and 28 of FIG. 2A, but the control protocol for the fibers 25 and 26 are fixed. The protocol on the fiber optics must be bi-directional to allow for control communication back and forth, but carried on two unidirectional fibers.

By connecting two PCB's via their control ports, dissimilar protocols may be connected together as long as the protocols have directional compatibility. In the configuration shown in FIG. 1, as long as source 11 and destination 14 are not both input only or output only, they can communicate via protocol 15, 16.

The duplex example shown in FIG. 2 makes use of the full bandwidth available from the two fibers connecting the PCBs with protocol 25, 26. This configuration allows simultaneous input and output communications from the board.

In the example of FIG. 2, a specific PCB design board 20 has a flexible input port 21. This port will connect to sensor specific data output ports via a standard parallel HIPPI connector (50 pair (100 pins) Emitter-Coupled Logic (ECL)) but not be constrained to the standard HIPPI interpretation of these 50 pairs. An on-board Field Programmable Gate Array (FPGA) is programmed so that information received on the 50 input lines, regardless of protocol, is translated to the interface protocol on 25,26. The FPGA approach also allows external information to be injected into the data stream. In a radar signal processing environment, this information might include the pointing direction of the radar as well as the control parameters.

For the specific embodiment of FIGS. 1 and 2, the protocol on 15,16 and 25,26 will be Fibre Channel, which is commercially available with the ability to pass up to 100 Mbytes/sec. The output port, 14 or 27,29, will be the standard HIPPI protocol, which is connected to a HIPPI destination on the high performance computer via a 100 pin, 50 pair standard differential ECL connector. This PCB will fit in a compact, standard 6U" VME form factor.

Accordingly, the invention offers simplicity, flexibility, and affordability. Only one printed circuit board part type is required. To implement new protocols, a single Field Programmable Gate Array (FPGA) chip is reprogrammed, rather than creating a new board type. The FPGA accommodates a new protocol by downloading design information without having to move any physical parts except for the PROM, thus eliminating possible damage to the system. Commercially available FPGAs have the speed required to implement the necessary protocol translations (25 MHz clocking for 100 Mbytes/sec communications).

System affordability is greatly improved because a single PCB design suffices for many protocols. The effort to design, test, debug, and maintain multiple unique board types throughout the system's life cycle is avoided. Costs are further reduced by addressing a broader swath of applications which leads to lower production costs and better supportability through higher volume production.

The specific Fibre Channel selected above can be replaced with any standard high performance serial interface. Alternatives include the Serial HiPPI "ad hoc" standard. Other approaches could also be selected, but adhering to commercial standards affords an economical base for parts supply. Fibre Channel uses the same fiber optic media as serial HIPPI; hence it supports transmissions distances up to 10 Km at 100 Mbytes/sec rates.

The main limitation of selecting HIPPI with its 50 pair ECL electronic media is that the sensors would have to be within 25 meters of the HPC.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. Apparatus for interconnecting a first medium having a prescribed interface and a second medium having a hardware interface reconfigurable at gate level;

said hardware interface being effective, through reconfiguring, to implement a variety of interface specifications effective for communicating information trough said second medium;

said prescribed interface implementing a specification effective for communicating information through said first medium;

said hardware interface being a one of:
  (1) asynchronous with respect to said prescribed interface,
  (2) strobed with no continuous clock present, and
  (3) synchronous with respect to said prescribed interface in a manner undetermined at reconfiguration; and said apparatus comprising said prescribed interface, said hardware interface, and means for connecting said prescribed interface and said hardware interface.

2. Apparatus as defined in claim 1 wherein each of said first and said second medium is compatible with a one of fiber optic cable, wire, and wireless media.

3. Apparatus as defined in claim 1 wherein said prescribed interface specification is High Performance Parallel Interface (HIPPI) or fiber channel.

4. Apparatus as defined in claim 1 wherein each of said first and said second medium supports bidirectional communications and feedback.

5. Apparatus as defined in claim 1, wherein said means for connecting includes a transceiver connected to said hardware interface.

6. Apparatus as defined in claim 1, wherein two implementations of said apparatus for interconnecting communicate over said prescribed interface.

7. Apparatus as defined in claim 1, wherein said hardware interface includes a field programmable gate array (FPGA).

8. Apparatus as defined in claim 7 wherein received information is communicated through a one of said first and said second medium and transmitted information is communicated through another of said first and said second medium;

said received information differs from said transmitted information; and conversion between said received and said transmitted information is performed by said FPGA.

9. Apparatus as defined in claim 8 wherein said transmitted information is derived from said received information.

10. Apparatus as defined in claim 8 wherein said transmitted information includes information not derived from said received information.

* * * * *